(12) United States Patent
Giordano

(10) Patent No.: US 7,891,257 B2
(45) Date of Patent: Feb. 22, 2011

(54) MONITORING DEVICE OF THE FEED TO AN ELECTRIC HOUSEHOLD APPLIANCE OF AN OPERATIVE FLUID, IN PARTICULAR OF A FLOW OF WATER TO A TANK OF A WASHING MACHINE OR DISHWASHER

(75) Inventor: Sergio Giordano, Caselle Torinese (IT)

(73) Assignee: ITW Industrial Components S.r.l. con Unico Socio, Milan (IT)

( * ) Notice: Subject to any disclaimer, the term of this patent is extended or adjusted under 35 U.S.C. 154(b) by 155 days.

(21) Appl. No.: 12/443,761

(22) PCT Filed: Dec. 11, 2007

(86) PCT No.: PCT/IB2007/003869

§ 371 (c)(1),
(2), (4) Date: Mar. 31, 2009

(87) PCT Pub. No.: WO2008/072067

PCT Pub. Date: Jun. 19, 2008

(65) Prior Publication Data

US 2010/0032026 A1    Feb. 11, 2010

(30) Foreign Application Priority Data

Dec. 13, 2006   (IT) .......................... TO2006A0882

(51) Int. Cl.
*G01F 15/00* (2006.01)
(52) U.S. Cl. .................................. 73/861.77
(58) Field of Classification Search ............... 73/722, 73/728, 861.79, 891.77; 137/392
See application file for complete search history.

(56) References Cited

U.S. PATENT DOCUMENTS 6,212,959 B1 * 4/2001 Perkins ................... 73/861.77
7,449,647 B2   11/2008 Kranjc
2007/0295104 A1 * 12/2007 Ellegood ................. 73/861.79

FOREIGN PATENT DOCUMENTS

DE   4444167 A1   7/1995
EP   1726702 A1   11/2006

OTHER PUBLICATIONS

ISR for PC/IB2007/003869 dated Jun. 2, 2008.

* cited by examiner

*Primary Examiner*—Jewel Thompson
(74) *Attorney, Agent, or Firm*—Lowe Hauptman Ham & Berner LLP

(57) ABSTRACT

A monitoring device including first detector means of a flow rate of operative fluid in an electric household appliance towards a tank of the electric household appliance and second detector means of the level of such a fluid in the tank; wherein the first and second detector means are operatively and reciprocally associated to issue a single signal (S) characterised by at least two different parameters, a first parameter (F) correlated to the flow rate of the fluid and a second parameter (A) correlated to the level of fluid in the tank. Typically, the first and the second detector means consist of a turbine mounted so as to be crossed in use by the flow of operative fluid and thereby turned at a speed proportional to the flow rate of fluid; in a membrane mounted within a casing to fluid-tightly divide the same into a first and second chamber connected respectively to atmospheric pressure and to siphon means arranged within the tank; in sensor means mounted on the membrane integral with the same and in interaction means with the sensor means, angularly and integrally mounted on the turbine and in a position so as to periodically transit in use in front of the sensor means in consequence of the rotation of the turbine.

9 Claims, 1 Drawing Sheet

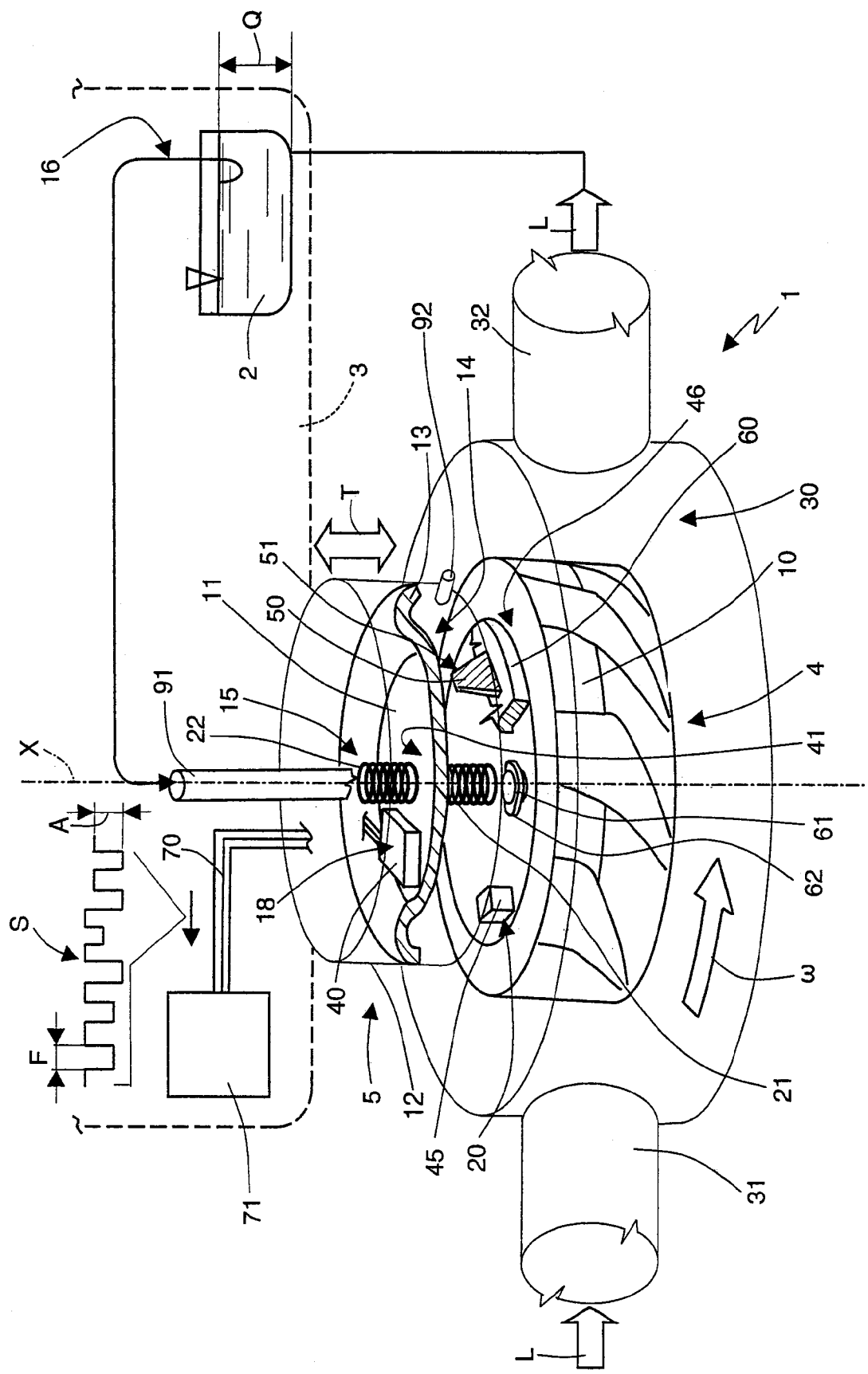

MONITORING DEVICE OF THE FEED TO AN ELECTRIC HOUSEHOLD APPLIANCE OF AN OPERATIVE FLUID, IN PARTICULAR OF A FLOW OF WATER TO A TANK OF A WASHING MACHINE OR DISHWASHER

RELATED APPLICATIONS

The present application is based on International Application Number PCT/IB2007/003869 filed Dec. 11, 2007, and claims priority from Italian Application Number TO2006A000882 filed Dec. 13, 2006, the disclosures of which are hereby incorporated by reference herein in their entirety.

TECHNICAL FIELD

The present invention relates to a monitoring device of the feed to an electric household appliance of an operative fluid, in particular a flow of water to a tank of a washing machine or dishwasher, for the purposes of simultaneously detecting both the flow rate of water towards the tank and the level of water gradually reached in the tank.

BACKGROUND ART

Especially in washing machines, and to a lesser extent in dishwashers, it is necessary to monitor the flow of washing water directed in use towards the tank of the electric household appliance, in order to verify how much water is fed and to verify the level of water present in the tank. Such two parameters are monitored today by means of two separate devices; e.g. as described in DE4444167 B4, the level of water present in the tank is read by means of an electromagnetic transducer, the mobile core of which is carried by a membrane which reads a pressure signal taken from the tank by means of a tube connected to siphon means present in the tank itself. Conversely, the hydraulic flow rate of operative fluid is read by means of common mechanical or electronic meters, based on a rotating turbine which is crossed by the operative fluid flow rate.

There is also known from FR-B1-2784403 a detection device of the angular position and/or of the speed of a rotating drum of a washing machine consisting of a permanent magnet (or electromagnet) carried facing a RID type sensor.

Even if satisfactory, the described devices do not allow an integrated reading of the two measured parameters, and therefore the processing of the signals is complex. Furthermore, they present relatively large dimensions.

DISCLOSURE OF INVENTION

It is therefore an object of the present invention to provide a monitoring device of the feed to an electric household appliance of an operative fluid capable of overcoming the limits of the known art and, at the same time, presenting high reliability, contained cost and size and high assembly ease.

According to the present invention, there is thus provided a monitoring device of the feed to an electric household appliance of an operative fluid.

In particular, the aforesaid device comprises first detector means of the rate of a flow of the operative fluid towards the tank, and second detector means of the level of the operative fluid in the tank. According to the invention, the first and second detector means are operatively associated to issue a single signal characterised by at least two different parameters, a first parameter correlated to the flow rate of the operative fluid and a second parameter correlated to the level of operative fluid in the tank.

The first and the second detector means consist of a turbine mounted so as to be in use run through by the flow of operative fluid and thereby turned at a speed proportional to the flow rate; in a membrane mounted within a first casing to fluid-tightly divide the same into a first and second chamber connected respectively to atmospheric pressure and to siphon means arranged within the tank; of sensor means mounted on the membrane integral with the same; and of interaction means with the sensor means, angularly and integrally mounted on the turbine and in a position such as to periodically transit in use in front of the sensor means in consequence of the rotation of the turbine.

According to a first possible embodiment, the sensor means consist of an electromagnetic Hall effect sensor integrally obtained on an electronic board glued directly onto a first face of the membrane facing in use towards the second chamber; while the interaction means consist of a permanent magnet carried in a predetermined angular and radial position on a first side face of the turbine arranged perpendicularly to the axis of rotation thereof and facing in use onto the side of the membrane.

In a second embodiment, the sensor means are of the optical type and the interaction means consist of a reflecting or opaque band having a variable extension along the direction of movement of the membrane, angularly and integrally connected, in an indirect and fluid-tight manner, to the turbine.

In this manner, a single pulsing voltage or current signal, varying in amplitude and in frequency according respectively to the distance of the membrane from the turbine and to the angular speed of the latter, is issued by the sensor integrally carried by the membrane. It is therefore possible, according to the invention, to simultaneously detect, by means of a single signal, both the flow rate and the total amount of water which run through the turbine, and the variation of the level of water in the tank in time, thus allowing to know, for example, whether the water pumped towards the tank actually ends up in the tank or whether, for example, it does not, either entirely or in part, for example due to the breakage of a tube or of the tank door seal; it is thus possible to simply perform safety checks until now either seldom or never performed. Moreover, the "composite" device according to the invention occupies considerably less space than the two separate devices of the known art and may be more easily arranged inside the electric household appliance, also requiring a considerably lower number of wirings.

BRIEF DESCRIPTION OF THE DRAWING

Further features and advantages of the present invention will become apparent from the description that follows of preferred embodiments thereof, provided by mere way of non-limitative example and with reference to the single accompanying drawing, which diagrammatically shows a monitoring device according to the invention applied to an electric household appliance with parts either removed or drawn in transparency for better clarity.

BEST MODE FOR CARRYING OUT THE INVENTION

With reference to the aforesaid FIGURE, numeral 1 indicates as a whole a monitoring device of the feed of a flow L (the direction and sense of which is indicated by the arrows) of an operative fluid towards a tank 2 of an electric household appliance 3, in particular of water towards the tank 2 of a washing machine or dishwasher 3; the device 1 comprises, in general, first detector means 4 of the rate of the flow L of the operative fluid towards the tank 2, and second detector means 5 of the level Q of the operative fluid in the tank 2.

According to the main aspect of the invention, the first detector means 4 and the second detector means 5 are operatively and reciprocally associated to issue a single signal S (shown in a merely diagrammatic and indicative manner) characterised by at least two different parameters, respectively a first parameter F correlated to the rate of the flow L of the operative fluid which runs through the detector means 4 and a second parameter A correlated to the level Q of the operative fluid instantaneously present in the tank 2.

In particular, the first and the second detector means 4 and 5 are, according to an aspect of the invention, integrated together and consist of a turbine 10, of the known type used in any flow meter, mounted so as to be in use run through by the flow L of operative fluid and thereby be turned at a speed proportional to the flow rate; and a membrane 11, formed by an elastomeric material, e.g. a synthetic or natural rubber, mounted within a first casing 12 to fluid-tightly divide the same, in the case in point by means of a first annular sealing edge 13, into a first chamber 14 and second chamber 15 connected respectively to atmospheric pressure and to siphon means 16, of the known type, arranged within the tank 2, as any pressure detector of the known type.

According to the invention, the integrated detector means 4 and 5 further consist of sensor means 18 mounted on the membrane 11 integral with the same; and interaction means 20 with the sensor means 18, angularly and integrally mounted on the turbine 10, in such a position as to periodically transit in use in front of the sensor means 18 in consequence of the rotation of the turbine 10.

Specifically, the membrane 11 is floatingly mounted between first 21 and second 22 elastic contrast means accommodated respectively within the first camber 14 and the second chamber 15 of the casing 12, which is generally cylindrical-shaped or in any case rotation-solid-shaped and normally consist of two half shells coupled side-by-side so as to secure the edge 13 of the membrane 11. Conversely, the turbine 10 is accommodated within a second casing 30 integrally obtained with the casing 12, in a position immediately underneath the membrane 11 and such that a through-running direction of the second casing 30 by the flow L of operative fluid (indicated by the same arrows showing the flow L) and a direction T of alternate movement of the membrane 11 against the bias of the elastic means 21,22 are reciprocally oriented in a perpendicular manner.

The second casing 30 supports the idle, fluid-tight turbine 10, turnable about an axis X essentially coinciding with a movement axis of the membrane 11 along the direction T, and also preferably formed (in a manner obvious for a person skilled in the art and therefore not shown) as a rotation solid coaxial with the axis X and with the casing 12, by means of two half shells fluid-tightly and reciprocally coupled side-by-side. The casing 30 is further provided with an inlet pipe 31 and an outlet pipe 32 for the operative fluid, between which the turbine 10 is accommodated, carried by the casing 30 in a tangent position with respect to the rotation axis of the turbine 10, which in the case in point coincides with the symmetric axis X of the casings 12 and 30 and of the membrane 11.

The casings 12 and 30 are preferably formed by a synthetic plastic material, e.g. by injection moulding.

In such a case and according to a first embodiment of the invention, the second means 18 consist of an electromagnetic Hall effect sensor integrally obtained on an electronic board 40 glued directly onto a first face 41 of the membrane 11 facing in use towards the second chamber 15; while the interaction means 20 consist o a permanent magnet 45 (see the left side of the FIGURE) carried in a predetermined angular and radial position on a first side face 46 of the turbine 10 arranged perpendicularly to the axis of rotation x and facing the side of the membrane 11 in use.

If the casings 12 and 30 are not formed by plastic, they must in any case, according to this embodiment, be formed by a material which does not disturb the magnetic field lines generated by the permanent magnet 45.

According to a second possible embodiment, the sensor means 18 are of the optical type, while the interaction means 20 consist of a reflecting or opaque band 50 (see the right side of the FIGURE), e.g. having a variable extension along the direction T of movement of the membrane 11, e.g. a band 50 mounted parallel to the axis X and delimited by an oblique edge 51.

In such a case, the interaction means 20, i.e. the band 50, are not directly carried by the turbine 10, because they must be accommodated in the casing 12, unlike the previous case, in which the permanent magnet 45 could also be accommodated in the casing 30, immersed in the operative fluid along with the turbine 10 or even embedded in the same, e.g. by co-moulding with the wall defining the face 46. The band 50 is thus angularly carried integrally by a rotating element 60 arranged within the casing 12 and angularly, integrally and fluid-tightly driven by the turbine 10 by means of at least one connection member 61 consisting, for example, of a shaft or supporting pin of the turbine 11 throughly mounted through the fluid-tight casing 30, e.g. by means of an o-ring 62.

In both possible described embodiments, the signal S which is issued by the sensor 18 by means of wires 70 e.g. towards a control unit 71 of the electric household appliance 3, is a pulsing voltage or current signal, varying in amplitude A and frequency F according respectively to the distance of the membrane 11 from the face 46 of the turbine 11 and to the angular rotation speed ω of the latter, indicated in the FIGURE by the curved arrow.

The casing 12 is also provided with hydraulic connection tubes 91 and 92 to the siphon means 16 and to the atmosphere, respectively; the connection tube 91 to the siphon means 16 is preferably arranged, in its end part which is engaged in the casing 12, in axis with the symmetry axis X of the entire device 1 and of rotation of the turbine 10, and in axis with the elastic means 21 and 22 consisting of counterpoised helical springs, coaxially mounted with axis X.

The invention claimed is:

1. A monitoring device of the feed of an operative fluid to a tank of an electric household appliance, in particular of water to the tank of a washing machine or dishwasher, of the type comprising first detector means of the rate of a flow (L) of said operative fluid towards the tank, and second detector means of the level (Q) of the operative fluid in the tank; characterised in that the first and the second detector means are operatively and reciprocally associated to emit a single signal (S) characterised by at least two different parameters, a first (F) correlated to the flow rate of the operative fluid and a second (A) correlated to the level (Q) of the operative fluid in the tank.

2. A device according to claim 1, characterised in that said first and second detector means consist in: a turbine mounted so as to be in use crossed by the flow (L) of operative fluid to be thereby turned at a speed (ω) proportional to the flow rate; a membrane mounted within a first casing to fluid-tightly divide the same into a first and second chamber connected respectively to atmospheric pressure and to siphon means arranged within the tank; sensor means mounted on the membrane integral with the same; and interaction means with the sensor means, angularly and integrally mounted on the turbine and in such a position as to periodically transit in use in front of the sensor means in consequence of the rotation of the turbine.

3. A device according to claim 2, characterised in that said membrane is floatingly mounted between first and second elastic contrast means accommodated respectively within said first and second chambers of the first casing.

4. A device according to claim 2, characterised in that said turbine is accommodated within a second casing integrally obtained with the first, in a position immediately underneath said membrane and so that a crossing direction of the second casing by said operative fluid and a direction (T) of alternate movement of said membrane against the bias of said first and second elastic means are oriented perpendicularly to each other.

5. A device according to claim 4, characterised in that said second casing supports said idle turbine, turnable about an axis (X) essentially coinciding with the axis of movement (T) of said membrane, the turbine being accommodated between an inlet conduit and an outlet conduit for the operative fluid carried by the second casing in tangential position with respect to the axis of rotation (X) of the turbine.

6. A device according to claim 1, characterised in that said sensor means consist in a Hall effect electromagnetic sensor integrally obtained on an electronic board directly glued onto a first face of said membrane facing in use towards said second chamber; and in that said interaction means consist in a permanent magnet carried in an predetermined angular and radial position on a first side face of said turbine arranged perpendicularly to the axis of rotation (x) and facing in use onto side of the membrane; said first and second casing being made of synthetic plastic material.

7. A device according to claim 1, characterised in that said interaction means are carried by a rotating element arranged within the first casing and angularly, integrally and fluid-tightly driven by said turbine by means of at least one connection member.

8. A device according to claim 7, characterised in that said sensor means are of the optical type and in that said interaction means consist in a reflecting or opaque band having variable extension along the direction of movement (T) of the membrane.

9. A device according to claim 1, characterised in that said single signal (S) is a pulsating voltage or current signal, variable in amplitude (A) and in frequency (F) according respectively to the distance of said membrane from said turbine and to the angular speed ($\omega$) of the latter.

* * * * *